United States Patent [19]

Stephens et al.

[11] Patent Number: 4,482,408
[45] Date of Patent: Nov. 13, 1984

[54] PLASTICIZER SYSTEM FOR PROPELLANT COMPOSITIONS

[75] Inventors: William D. Stephens, Huntsville, Ala.; Brenda K. Rodman, Catlett, Va.

[73] Assignee: The United States of Amercia as represented by the Secretary of the Air Force, Washington, D.C.

[21] Appl. No.: 497,456

[22] Filed: May 23, 1983

[51] Int. Cl.$^3$ .................................... C06B 45/10
[52] U.S. Cl. ........................ 149/19.4; 149/19.9; 560/157
[58] Field of Search .............. 149/19.4, 19.9; 560/157

[56] References Cited

U.S. PATENT DOCUMENTS

| | | | |
|---|---|---|---|
| 3,740,279 | 6/1973 | Levering et al. | 149/19.91 |
| 4,001,191 | 1/1977 | Reed | 149/19.91 |
| 4,098,626 | 7/1978 | Graham et al. | 149/19.4 |
| 4,210,568 | 7/1980 | Makowski et al. | 260/32.4 |
| 4,242,488 | 12/1980 | Stanley et al. | 428/423.1 |
| 4,340,686 | 7/1982 | Foss | 525/59 |

OTHER PUBLICATIONS

Lesiak et al., *Chem. Abs.*, 77, Abs. #139398u, (1972).

*Primary Examiner*—Edward A. Miller
*Attorney, Agent, or Firm*—Donald J. Singer; William J. O'Brien

[57] ABSTRACT

The present invention concerns itself with the synthesis of N-octyldecylbutyl urethane and its use as an internal plasticizer for solid propellants.

1 Claim, No Drawings

PLASTICIZER SYSTEM FOR PROPELLANT COMPOSITIONS

STATEMENT OF GOVERNMENT INTEREST

The invention described herein may be manufactured and used by or for the Government for governmental purposes without the payment of any royalty thereon.

BACKGROUND OF THE INVENTION

This invention relates to solid propellant compositions and to an improved plastercizer system for use therewith. In a more particular aspect, this invention concerns itself with a novel straight chained, saturated, carbamic acid ester-ether of particular molecular structure and to its use as an internal plasticizer for isocyanate-cured propellant compositions.

The increased interest and utilization of solid propellant compositions has spawned a considerable research effort in an attempt to improve their ballistic and physical properties. Generally, solid propellants are composed of one or more organic or inorganic oxidizers dispersed in a resinous binder matrix which may also function as a fuel. Typical oxidizers are ammonium perchlorate or HMX (cyclotetramethylene tetranitramine), both of which are well known in the art. Various resinous components, such as hydracarbons, polyesters, polyurethanes and other like materials may serve as a binder/fuel matrix. A supplemental fuel component, such as finely powered aluminum, may be used also. Other additive components, such as anti-oxidants, burning rate modifiers, wetting agents, anti-foaming agents and plasticizers may be added to the propellant composition, if desired. Dibutylphthalate, dioctyl adipate or triacetin are often employed as inert plasticizers in combination with the resinous binder material.

Plasticizers are used in rocket propellants for a number of purposes. These include processing assistance by incorporation of fluid materials in the propellant mix, the improvement of low temperature flexibility and the improvement of mechanical properties and ballistic characteristics. In using solid propellants, however, a problem exists in the use of plasticizers because of the tendency of plasticizer molecules to migrate or evaporate out of the propellant composition during storage. Either of these processes results in chemical changes in the composition which are harmful to the propellant and to other inert parts of the rocket motor. On long term storage, changes in the mechanical properties of the propellant often occur, particularly near the linear-propellant bond. Other negative effects which are associated with the use of plasticizers include crystallization at low temperatures, a tendency to soften the propellant excessively at high temperatures, and the fact that the plasticizer may migrate into the liner from the uncured propellant much more rapidly than it does from a cured propellant system. As a consequence, a continuing research effort has been conducted in an attempt to solve the migration problem associated with propellant plasticizers, and provide a plasticizer that does not migrate rapidly even in an uncured propellant. One research effort involved the use of a material known as ZL-496. This material, ZL-496, is a polybutadiene with a molecular weight of approximately 3,000. The use of ZL-496, as a plasticizer, was contemplated because its molecular size is quite large and it was believed that its polymer chain entanglement would prevent migration. Unfortunately, however, it was found that even plasticizer molecules as large as ZL-496 do have some tendency to migrate out of the propellant composition and thus shorten the shelf life of the rocket motor.

In furthering the above research effort, however, it was unexpectdly discovered that a branch-chained, saturated, carbamic acid ester of particular molecular structure could be utilized as a plasticizer in the fabrication of solid propellants. This novel plasticizer replaces the conventional plasticizers generally utilized in composite propellants, especially those having a binder base which utilizes an isocyanate cure reaction for its curing system. The resulting propellant exhibits a minimum amount of plasticizer migration during a normal shelf-life period.

SUMMARY OF THE INVENTION

In accordance with this invention, there is provided a novel compound which acts effectively as a plasticizer for propellant compositions without the attendant problems of plasticizer migration which occur during propellant storage. The plasticizer of this invention is a carbamic acid ester having a particular molecular structure as illustrated by the following structure formula.

This plasticizer is used in a propellant composition in a binder/plasticizer ratio ranging from about 75 to 95 parts by weight of binder to 5 to 25 parts by weight plasticizer.

Accordingly, the primary object of this invention is to provide a novel carbamic acid ester having a particular molecular structure.

Another object of this invention is to provide a novel solid propellant composition that produces only minimum amounts of plasticizer migration during its shelf-life.

Still another object of this invention is to provide a novel carbamic acid ester that finds particular utility as an internal plasticizer for solid propellant compositions.

The above and still other objects and advantages of the present invention will become more readily apparent upon consideration of the following detailed description thereof.

DESCRIPTION OF THE PREFERRED EMBODIMENTS

With the above-mentioned and other objects in mind, the present invention contemplates the synthesis of a novel carbamic acid ester-ether and its utilization as an internal plasticizer in a conventional composite solid propellant.

The novel plasticizer contemplated by the present invention is in a straight-chained, saturated, carbamic acid ester-ether having the following structural formula.

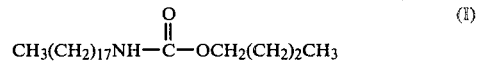

It is believed that the particular molecular structure illustrated in Formula (I) above provides a particular advantage for the use of this ester-ether as an internal plasticizer. The plasticizer links to the binder network of the propellant through strong hydrogen bonding rather than reacting with the isocyanate curing agent and its cure network. The plasticizer is unable to migrate or evaporate away from the propellant during storage because it remains relatively free within the propellant until the cure reaction is complete. After cure, the material is attached through hydrogen bonding to the cure site. This provides the propellant with an excellent shelf-life during storage.

The synthesis of the urethane-type plasticizer of this invention is accomplished by effecting a reaction between an equimolar mixture of octyldecyl isocyanate and n-butyl alcohol. The reaction is illustrated by the following reaction scheme.

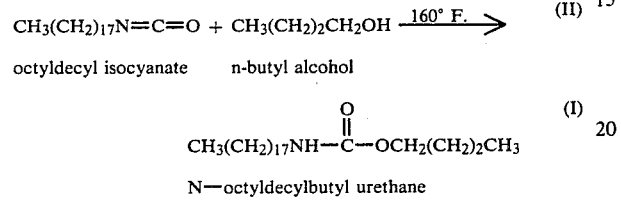

$$CH_3(CH_2)_{17}N=C=O + CH_3(CH_2)_2CH_2OH \xrightarrow{160°\ F.}$$ (II)

octyldecyl isocyanate    n-butyl alcohol $$CH_3(CH_2)_{17}NH-\overset{O}{\underset{\|}{C}}-OCH_2(CH_2)_2CH_3$$ (I)

N—octyldecylbutyl urethane

Example 1 which follows discloses the experimental details of the reaction and method of synthesis illustrated by equation (II).

EXAMPLE I

Procedure 59.0 g (0.2 moles) of octyl decyl isocyanate (MW=295 g/mole) was mixed with 16.28 g (0.2 moles+10% excess) of n-butyl alcohol in a flask of appropriate size. The flask was covered with a watch glass aluminum foil and set in a 170° oven. The disappearance of the isocyanate was monitored by FT-IR. The isocyanate was 100% reacted after 24 hours and the excess alcohol was removed by rotary evaporation.

An illustration showing the use of the novel internal plasticizer of this invention in a solid propellant is shown in Table I as follows. Although an ammonium perchlorate oxidizer and an isocyanate-cured polybutadiene binder are preferred, other conventional oxidizing and resinous binders may be utilized, if desired, as well as other conventional propellant components.

Solid propellant compositions are well known and since the basic preparation and constituent ingredients of the propellant composition of this invention are not significantly altered or critical to the execution of the invention, with the exception of the internal plasticizer component, a detailed explanation of the propellant's preparation is not deemed necessary. The plasticizers of this invention are preheated with the isocyanate curing agent and then incorporated into the propellant mix in a conventional manner at any stage prior to cure. Generally, all of the ingredients are homogeneously mixed in a conventional blender. After mixing, the uncured propellant mix is then placed in an oven and cured at a temperature and for a period of time sufficient to produce a firm, rubbery, solid propellant. The resulting propellant differs from a conventional propellant only in the essential replacement of the conventional plasticizer with the novel internal plasticizer of this invention.

TABLE I

| | |
|---|---|
| 68.0 | parts by weight of ammonium perchlorate. |
| 7.45 | parts by weight of hydroxy-terminated polybutadiene (R-45M) |
| 22.0 | parts by weight of aluminum powder fuel |
| 0.25 | parts by weight of a curing agent, isophorone diisocyanate (IPDI) |
| 2.0 | parts by weight of the Internal Plasticizer of this invention which was prereacted with IPDI |
| 0.30 | parts by weight of a bonding agent, HX-752 |
| 0.075 | parts by weight of a delayed quick-cure catalyst (equal parts MgO, Triphenyl Bismuth, and Maleic Anhydride). |

These ingredients were thoroughly mixed in a conventional mixer. After a homogeneous mixture had been obtained, the uncured propellant was placed in an oven at 170° F. for 7 days. After the seven day period, a firm, rubbery solid propellant was obtained.

Tables II and III which follow illustrate conventional propellant compositions using dioctyl adipate (DOA) as an internal plasticizer in the one case and no plasticizer in the other. Table IV discloses the physical properties of a propellant using the plasticizer of this invention; a propellant using DOA plasticizer; and a propellant with no plasticizer for comparison purposes.

It can be seen from Table IV that the propellant plasticized by the novel carbamic acid ester of this invention shows considerable improvement in its physical properties over DOA and unplasticized propellants in addition to solving the problem of plasticizer migration.

TABLE II

FORMULATION OF DOA PLASTICIZED PROPELLANT

| INGREDIENT | PARTS BY WEIGHT OF MIX |
|---|---|
| DOA | 2.0 |
| MAGNESIUM OXIDE | 0.025 |
| ALUMINUM | 22.0 |
| AP 200 | 51.0 |
| AP 6900 | 17.0 |
| MALEIC ANHYDRIDE | 0.025 |
| TRIPHENYL BISMUTH | 0.025 |
| R45M BINDER | 8.0 |

TABLE III

FORMULATION OF ANALOG SPACE PROPELLANT

| INGREDIENT | PARTS BY WEIGHT OF MIX |
|---|---|
| Tepanol | 0.15 |
| Magnesium Oxide | 0.025 |
| H-30 Aluminum | 21.0 |
| AP 200 | 48.3 |
| AP 6900 | 20.7 |
| Octadecyl Isocyanate | 0.04 |
| Maleic Anhydride | 0.025 |
| Triphenyl Bismuth | 0.025 |
| R-45H w MAO-111 Binder | 9.81 |
| IPDI | |

TABLE IV

PHYSICAL PROPERTIES OF PROPELLANTS

| Type | Mix | NCO/OH* | Maximum Stress (psi) | Strain Maximum Stress (%) | Shore A Hardness (10 sec) |
|---|---|---|---|---|---|
| Unplasticized | 123 | 1.0 | 53 | 221 | 13 |
| | 124 | 1.05 | 60 | 114 | 25 |
| | 125 | 1.10 | 68 | 105 | 31 |
| | 126 | 1.15 | 82 | 104 | 31 |
| 20% DOA plasticizer | 130 | 0.9 | Too tacky to test | | |
| | 131 | 1.0 | 38 | 193 | 9 |
| | 132 | 1.1 | 47 | 120 | 23 |
| | 133 | 1.2 | 49 | 99 | 25 |
| | 134 | 1.3 | 54 | 129 | 24 |
| 20% | 141 | 1.0 | 65 | 751 | 28 |

TABLE IV-continued

PHYSICAL PROPERTIES OF PROPELLANTS

| Type | Mix | NCO/OH* | Maximum Stress (psi) | Strain Maximum Stress (%) | Shore A Hardness (10 sec) |
|---|---|---|---|---|---|
| plastizer of this invention | 142 | 1.1 | 71 | 280 | 41 |
| | 143 | 1.2 | 63 | 182 | 42 |
| | 144 | 1.3 | 77 | 222 | 41 |
| | 145 | 1.4 | 130 | 314 | 44 |

*Ratio of total NCO from IPDI to total —OH from both polymer and plasticizer.

While the present invention has been described by reference to a particular embodiment, it should be understood by those skilled in the art that all the modifications that are embodied within the scope of the appended claims are intended to be included herein.

What is claimed is:

1. A solid propellant composition comprising a cured homogeneous mixture of:
    A. a solid, particulate, oxidizer component;
    B. a synthetic resinous, polyisocyanate cured, polybutadiene binder component; and
    C. a carbamic acid ester plasticizer having the following structural formula:

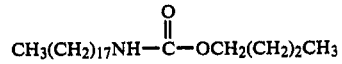

wherein said plasticizer is present in a binder plasticizer ratio ranging from about 75 to 95 parts by weight of binder to 5 to 25 parts by weight of plasticizer.

* * * * *